US008463628B1

(12) United States Patent
Loeb et al.

(10) Patent No.: US 8,463,628 B1
(45) Date of Patent: Jun. 11, 2013

(54) METHODS AND SYSTEMS FOR FACILITATING THE SALE OF SUBSCRIPTION RIGHTS

(75) Inventors: Michael R. Loeb, New York, NY (US); Edward J. McCabe, Yonkers, NY (US)

(73) Assignee: Loeb Enterprises, LLC., New York, NY (US)

( * ) Notice: Subject to any disclaimer, the term of this patent is extended or adjusted under 35 U.S.C. 154(b) by 1268 days.

(21) Appl. No.: 11/701,713

(22) Filed: Feb. 2, 2007

(51) Int. Cl.
*G06Q 10/00* (2012.01)
*G06G 7/00* (2006.01)

(52) U.S. Cl.
USPC .............. 705/5; 705/1.1; 705/7.35; 705/400

(58) Field of Classification Search
USPC .................... 705/38, 37, 26, 1.1, 5, 7.35, 400
See application file for complete search history.

(56) References Cited

U.S. PATENT DOCUMENTS

| | | | |
|---|---|---|---|
| 2002/0147675 A1* | 10/2002 | Das et al. ........................ | 705/37 |
| 2003/0004780 A1* | 1/2003 | Smith et al. ..................... | 705/10 |
| 2003/0093326 A1* | 5/2003 | Poon et al. ...................... | 705/26 |
| 2003/0236736 A1* | 12/2003 | Harmon et al. ................. | 705/37 |
| 2004/0006497 A1* | 1/2004 | Nestor et al. .................... | 705/5 |
| 2005/0015330 A1* | 1/2005 | Beery et al. ..................... | 705/38 |
| 2006/0265361 A1* | 11/2006 | Chu .................................. | 707/3 |
| 2006/0294043 A1* | 12/2006 | Taisdeal ........................... | 707/1 |

* cited by examiner

*Primary Examiner* — George Chen

(57) ABSTRACT

Methods and systems for facilitating subscription rights sales, typically in the form of season ticket sales, between buyers and sellers. Ticket holders are provided with the ability to identify selected tickets and to flexibly and easily establish criteria under which they will entertain offers to sell these tickets. Ticket holders may thus monetize unused tickets, under favorable conditions, based upon individual offers and without the requirement of a definite commitment to sell. Concomitantly, buyers are provided access to a large base of potentially available tickets, which might not otherwise be available for sale. Buyers may assemble offers based upon seller criteria and, in some instances, useful historical information. The invention facilitates the buyer/seller interaction by publishing available ticket information in useful formats, collecting and providing buyer offers which meet seller criteria to sellers for consideration, facilitating communications and negotiations between buyers and sellers, and facilitating the actual purchase and sale of tickets.

18 Claims, 4 Drawing Sheets

METHODS AND SYSTEMS FOR FACILITATING THE SALE OF SUBSCRIPTION RIGHTS

FIELD OF THE INVENTION

The present invention relates generally to methods and systems for facilitating the sale of subscription rights such as seasonal passes to forums.

BACKGROUND OF THE INVENTION

Tickets to attend an event, such as a concert or a sports event, are of transitory value. Like rights to attend any expiring event, once the event has been completed, the tickets are relatively worthless. Subscription tickets, for example season tickets, have a relatively high rate of non-attendance and hence a lot of the value of the tickets is wasted. Issues surrounding ticket utilization, or lack thereof, fall into two general categories, which might best be described as concerns of ticket-holders and concerns of potential ticket buyers.

Ticket Holder Concerns

Many individuals purchase tickets far in advance in order to guarantee seating at events. Ticket purchases may be for individual events or for groups of events such as seasonal passes. Advance ticket purchases are made knowing full well that a certain percentage of events will not be attended for circumstances unknown at the time of the purchase. While there might be some guilt associated with allowing some subset of season tickets to go unused, because the seasonal ticket cost is "sunk" (unrecoverable) the rational ticket holder makes their decision to attend a game based upon the value of attending that game versus the opportunity cost of attending the game; the decision is not based solely on the price paid for the ticket, but by considering all present options that might not have been contemplated at the time the ticket was purchased.

However, not all decision making is rational. In fact, many individuals do weigh the "sunk" ticket cost into their decision-making process; as a result many ticket-holders thus attend a number of games which they are not really interested in attending, or which should not be attended because the opportunity cost is greater than the value of attendance. This attendance may not be an efficient use of their time—however, it happens anyhow. For these individuals, a means for assuaging the economic guilt of abandoning ticket costs would change the calculus involved in deciding to attend or not, allowing them greater latitude in attending certain games and not others.

In general, there exists four groups, or types, of ticket holders:
- Those that know they will attend an event for which they hold a ticket.
- Those that know they won't attend an event for which they hold a ticket.
- Those that don't know whether they will attend an event for which they hold a ticket, but are likely to make a decision at the last-minute.
- Those that could be swayed to either attend or not attend an event depending on whether they received financial compensation for a ticket.

Ticket Buyers Issues

Counter-balancing ticket holders and their willingness to part with tickets are individuals that, for one reason or another, have not been able to secure tickets to a desired event but wish to attend. They may not have been able to purchase a ticket before supply ran out, may not have known of the event in time to purchase tickets, may not have been willing or able to pay the ticket price, or didn't know they wanted to attend an event until very near to the start of the event. This group includes an enormous amount of people, including the most price sensitive—for whom tickets are too expensive—and the most price insensitive—for whom the cost of tickets is no issue. These individuals desire tickets and are willing to pay a price in order to secure them, though within this class of ticket acquirers, there is enormous variability in willingness and ability to pay.

There is thus seen to be a highly inefficient market for unused season ticket rights. Some tickets go to waste. Some individuals attend games when there are other places they'd rather be. Concomitantly, there exist individuals that would like to get tickets but can't. These individuals want to attend an event and may be willing to pay a price that would satisfy the demands of ticket holders wishing to sell their tickets. Further, certain individuals might be willing to pay a price that would satisfy the demands of ticket holders that are not actively looking to sell their tickets, but are willing to consider an offer.

The present inventors have determined that there is no easy means of brokering an agreement between ticket holders and ticket buyers. This is particularly true with respect to last-minute ticket transactions. As a result, many tickets go to waste.

Considering now previous attempts at solving these problems. Perhaps the oldest means of disposing of excess ticket inventory, and in some ways still the most effective, is scalping. Scalpers show up at an event and look for individuals that need tickets. Scalping suffers from the enormous problems of often times being illegal, feeling uncomfortable for the participating parties and requiring a physical presence at a venue. Scalping is a popular but troublesome solution to the problem of disposing of unused tickets.

One favorite means of quickly disposing of unused tickets is to simply give them away. Gifting typically involves last minute calls to friends, or sometimes mass emails to co-workers. The tickets are generally offered for free, and often result in successfully finding and satisfying an interested party that will attend the event if they don't have to pay for the tickets. Of course, there are undoubtedly people outside of the seller's immediate contact list that would be willing to pay for the ticket, but there is no reliable way of identifying them in a typical gifting situation. This solution does nothing to assuage the sunk-cost guilt suffered by ticket holders who cannot find takers and who thus still feel remorse at the financial loss of unused tickets or obligation to go to games they might not really want to attend.

Another option for disposing of tickets is to sell them in an online market, for example through Craigslist.org. This type of commerce is generally anonymous and easy. However, it requires that a ticket holder know in advance that they don't plan to attend a ticketed event. There is also a lot of administrative follow up. Individuals still have to mail or deliver the tickets, arrange payment, etc.

Online auctions are available through which many individuals sell many types of products and services, including tickets. See, for example, the famous Internet auction website www.ebay.com. As with other types of online markets, to auction a ticket a seller must know in advance that he wishes to make a binding sale. As with the online sales described above, options are generally not conducive to last minute, easy sales.

The Internet Web site Stubhub.com is an online ticket transaction system that facilitates sales between private buyers and sellers. Stubhub.com does not solve the above-described problems of on-the-fence sellers. All of the sellers that list tickets on Stubhub.com are active sellers that create an information profile for a ticket(s) they know in advance that they want to sell. The Web site functions like a specialized auction site for tickets.

Priceline.com is another online commerce system, wherein buyers name their own price for products and services, the system attempting to fill the buyer demand with available supply. However, priceline.com is generally set up to accommodate institutional sellers of quantity, expiring value products such as airline tickets. Priceline.com is generally not conducive to accommodating the needs of individual sellers.

The present inventors have recognized the need for methods and systems that enable subscription rights holders, such as season ticket holders, to flexibly and easily set criteria under which they will consider offers for and may sell unwanted tickets, while simultaneously enabling potential buyers access to a large inventory of otherwise unavailable products.

SUMMARY OF THE INVENTION

The present inventors believe there are an enormous number of "on-the-fence" or "passive" subscription ticket holders that would consider selling at least some of their tickets under the right circumstances including for the right price. These subscription ticket-holders are believed to possess far more tickets than the ticket sellers that currently list their tickets for sale online under the existing, limited-capability systems. The reason for this is that existing ticket sales systems do not provide sellers with the ability to flexibly and easily select and implement sales criteria that would motivate the sale of a subset of pre-paid subscription tickets.

In accordance with one embodiment of the invention there are provided methods and systems for selling a right to attend an event, a method comprising:

identifying a ticket to an event including an owner of the ticket;

receiving from the owner criteria under which the owner of the ticket will consider an offer to purchase the ticket;

displaying information about the ticket, with the criteria, for consideration by a plurality of buyers;

receiving from a buyer, responsive to the displaying, an offer to purchase the ticket;

communicating the offer to the owner; and communicating a response to the offer to the buyer.

In accordance with another embodiment of the invention there are provided methods and systems for selling a right to attend an event, one method comprising:

identifying a plurality of tickets from a group of subscription tickets to corresponding events, including an owner of the group of subscription tickets;

receiving from the owner criteria under which the owner of the plurality of tickets will consider an offer to purchase one or more of the plurality of tickets, the criteria including at least one of the group including a determined criteria and an unpredictable criteria;

displaying for each of the plurality of tickets information about the ticket, including an event description an event venue and an event date, and the criteria, for consideration by a plurality of buyers;

receiving from at least one buyer, responsive to the display of the criteria, an offer to purchase at least one ticket of the plurality of tickets;

comparing the offer to the criteria;

processing the offer, based upon the comparing, by performing at least one of the group comprising communicating the offer to the owner, automatically accepting the offer and automatically rejecting the offer;

receiving, if the offer is communicated to the owner, an acceptance or rejection of the offer;

communicating a response to the offer to the buyer; and periodically communicating to the owner a status of each of the tickets in the plurality of tickets.

The invention is thus in one respect a marketplace for subscription rights such as subscription tickets that enables buyers to identify and contact passive sellers, regarding specific tickets, in accordance with criteria set by the sellers. By allowing buyers to contact a pre-registered base of ticketholders, a here-to-for untapped supply of potentially saleable tickets will be made available to the market.

DESCRIPTION OF THE DRAWING FIGURES

These and other objects, features and advantages of the invention will be apparent from a consideration of the following Detailed Description Of The Invention considered in conjunction with the drawing Figures, in which.

DETAILED DESCRIPTION OF THE INVENTION

In accordance with the present invention, there are provided herein methods and systems for facilitating the sale and purchase of subscription rights, for example of individual tickets within season ticket groups, to events such as sporting events. The present invention enables owners of such tickets to enjoy the benefits accruing to subscription rights, such as the right to attend all selected events, along with the benefit of overcoming the traditional 'sunk cost' waste through the easy and flexible ability to sell rights to attend undesired events. The invention provides to buyers the opportunity to offer to buy, and often purchase, tickets to events which might not otherwise be accessible or affordable.

As noted above, the present inventors believe there are a large number of seasonal ticket holders that would be willing to part with tickets to individual events under the right conditions, including for the right price. These subscription ticket holders are believed to hold far more tickets than the individual ticket holders that list their tickets for sale online. One reason that there are more ticket holders that might be willing to sell under the right conditions than those that actively list their tickets online is that traditional avenues for selling tickets require the seller to actively engage the systems to create a listing for the ticket, and create an offer to sell their ticket. This process is cumbersome and not intuitive; it is difficult, and requires true consideration on the part of the ticket holder. Another reason for this is that, in the absence of a firm offer, ticket holders feel obligated to attend an event for which they have paid.

The present invention is therefore directed to a consumer marketplace that enables sellers to list potentially available tickets along with criteria that might motivate their sale, and enables buyers to contact those sellers with offers. By allowing buyers to access a pre-registered base of potentially available seasonal tickets, a large supply of otherwise unavailable tickets is made available to the benefit of both buyers and sellers. Buyers assert their interest in a listed ticket through a controlled, direct-response marketplace. Sellers are contacted according to their preferences and respond on a ticket-by-ticket basis as to whether or not they have an interest in selling a particular ticket.

As used herein, examples and illustrations are exemplary in nature and not limiting. Further as used herein, references to seller "preferences" and "criteria" are used interchangeably to broadly indicate seller-designated conditions and parameters for the sale of tickets. References to "tickets" and variants thereof refer broadly to rights to attend events and may include paper, electronic, or other indicia of the rights.

Figure 1:
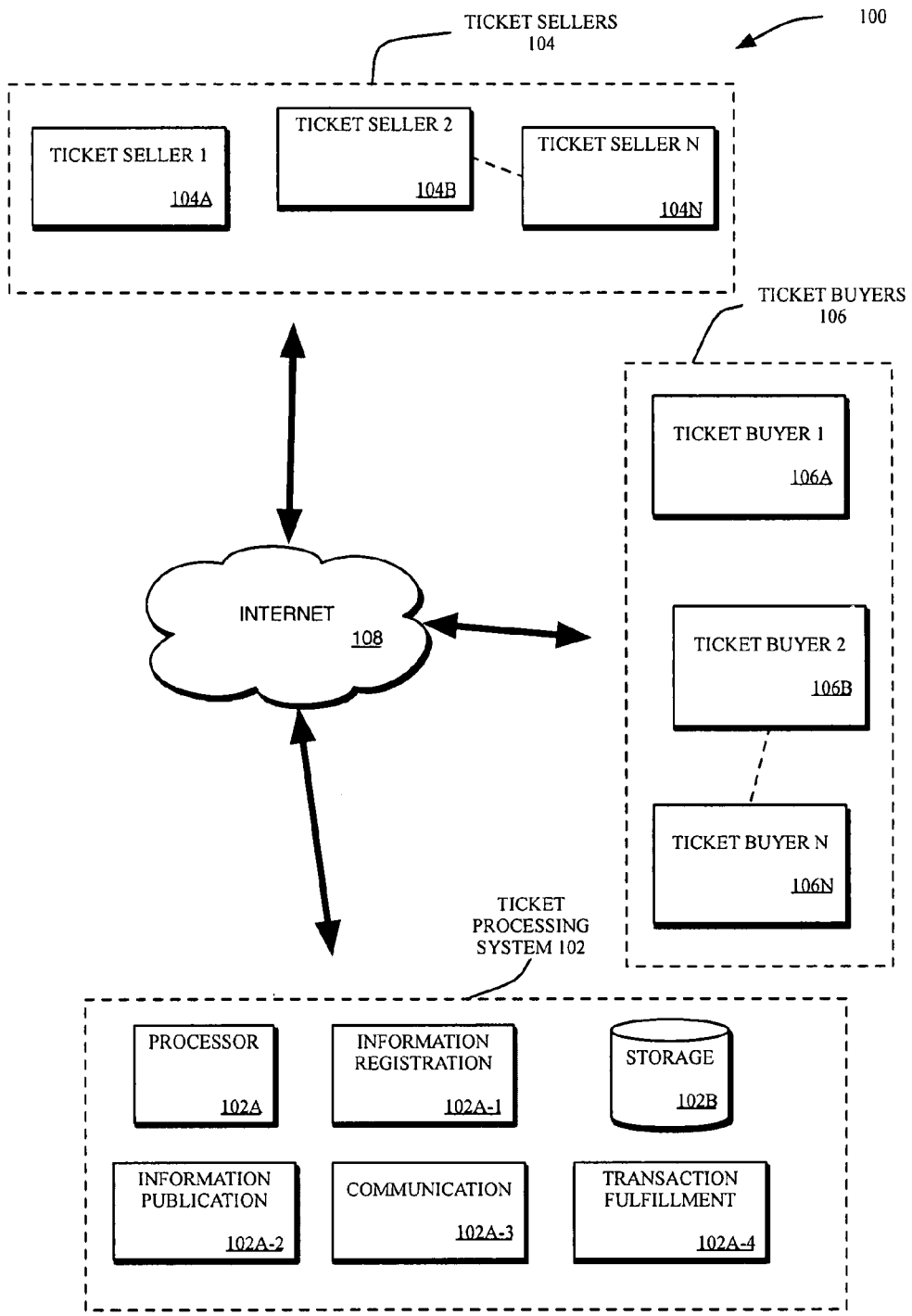
FIG. 1 is a block diagram of a system in accordance with one embodiment of the present invention.

With reference now to FIG. 1, there is shown a system 100 including a ticket processing system 102 connected to communicate with tickets sellers 104 and ticket buyers 106 through an electronic network such as the Internet 108.

Ticket processing system 102 comprises a conventional processing system, including a processor 102A and a storage system 102B, for example in the form of a personal computer, network server system, mainframe computing system and/or an appropriate combination of the same or similar components. In a manner well known in the art, ticket processing system 102 may comprise a single computing system or multiple computing systems, co-located and/or geographically disperse. Ticket processing system 102 includes conventional processing system components, for example: an operating system(s), application software, user interfaces, network and communication interfaces, and other components and functions appropriate to perform the invention described herein.

Ticket sellers 104, three of which are shown at 104A, 104B, 104N, comprise business and/or personal holders of subscription tickets as described herein above. Ticket sellers may interface with ticket processing system 102 through network 108, for example using personal computers, cellular telephones, personal digital assistants, kiosks or any other appropriate user interface. While three tickets sellers are illustrated, it will be understood that essentially an unlimited number of ticket sellers may be supported by ticket processing system 103.

Ticket buyers 106, three of which are shown at 106A, 106B, 106N, comprise business and/or personal buyers desiring to purchase subscription tickets as described herein above. Ticket buyers may interface with ticket processing system 102 through network 108, for example using personal computers, cellular telephones, personal digital assistants, kiosks or any other appropriate user interface. While three tickets buyers are illustrated, it will be understood that essentially an unlimited number of ticket buyers may be supported by ticket processing system 103.

In accordance with one embodiment of the invention, system 102 is seen to include the functions of registration of ticket and seller information 102A-1, publication of ticket and seller information for buyer consideration 102A-2, communications of offers from buyers and rejections or acceptances by sellers 102A-3 and transaction fulfillment 102A-4 for facilitating consummation of sales between buyers and sellers. It will be understood that these functions, described in detail below, can be implemented in hardware, software or any combination of the two, typically referred to as firmware.

Figure 2:
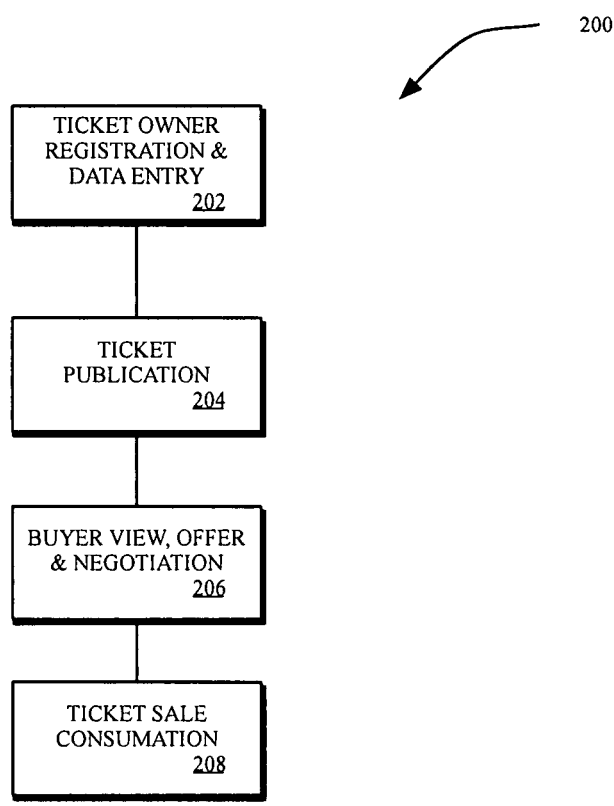
FIG. 2 is a flow chart showing a high-level overview of a process in accordance with the present invention.

With reference now to FIG. 2, an overview 200 of the present invention is shown wherein a ticket holder registers with ticket processing system 102 and enters information regarding potential ticket sales (step 202; 102A-1 from FIG. 1). Ticket processing system 102 publishes the ticket information (step 204; 102A-2 from FIG. 1), whereby buyers may view ticket listings and negotiate for selected tickets (step 206; 102A-3 from FIG. 1). Upon agreements being reached between buyers and sellers, ticket sales are consummated as described herein below (step 208; 102A-4 from FIG. 1).

Figure 3:
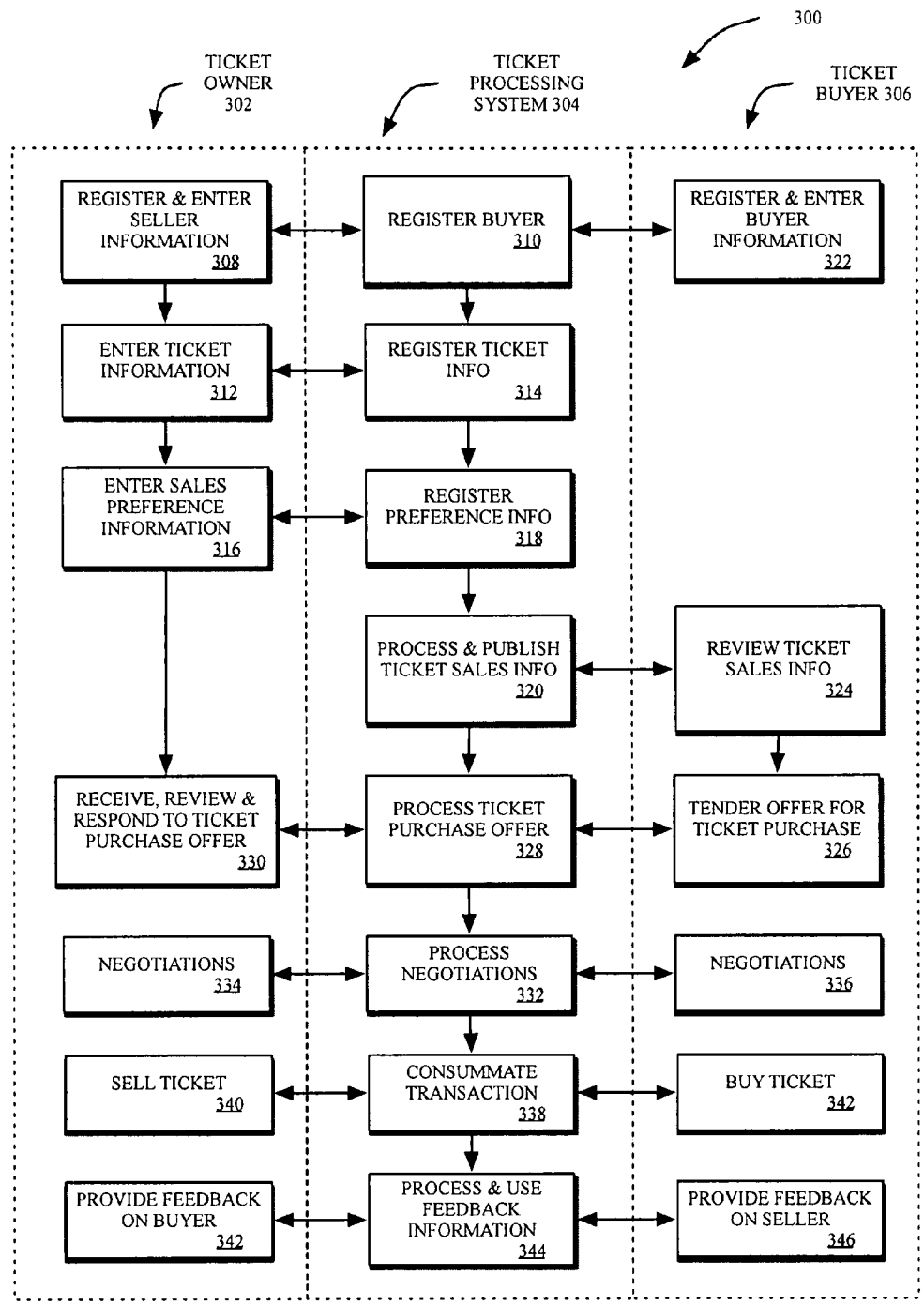
FIG. 3 is a flow chart showing the details of a process in accordance with the present invention.

With reference now to FIG. 3, a process 300 is shown illustrating the respective actions of, and interactions between, a ticket owner 302, the ticket processing system 304 and a ticket buyer 306.

In accordance with the process 300, a season ticket holder registers with the ticket processing system (steps 308, 310), for example through a kiosk at the point of purchase of the ticket or through another device as described herein above. Registration information provided to establish an account can include, for example: personal contact information, financial account information, and/or other information as is necessary to transact business. As part of establishing the account, the ticket seller agrees to be contacted via an approved means before each event, or to otherwise consider and respond to, any appropriate offer(s) for listed tickets. As used herein, an appropriate offer is one which meets or exceeds a ticket sellers preset criteria.

Subsequent to registration, the ticket seller provides ticket information which is collected and stored within the ticket processing system (steps 312, 314). Ticket information may include, for example: event(s) description(s), event dates, event venues, ticket seat information, and other information pertinent to the sale and purchase of an event ticket.

Along with the basic ticket information, the seller provides and the system registers ticket sales preference information (steps 316, 318). This preference information describes the terms under which the seller will entertain sales offers from buyers. Basic preference information may include, for example: offer dates, offer amount thresholds, number of tickets to be sold/bought and other information pertinent to motivating the seller to consider an offer for the tickets.

In this described embodiment, ticket sales preferences, or criteria, are made available for the seller to select and use in at least two ways. The system 102 itself may provide lists of ticket sales criteria, for example through graphical user interfaces, from which the ticket seller may select. Users may be provided questions, the answers to which the system collects as input information. Additionally, preference fields may be provided for completion by the ticket holder/seller, for example in the form of blank fields complete-able by the user and in which the user may specify criteria under which offers will be considered.

In one example, a holder of 4 season tickets for adjacent seats to baseball games may indicate he will consider offers: 1) received within a window of between 7 and 0 days prior to a sale, 2) for an amount no less than $25/ticket, and 3) for no less than 2 of the tickets.

In addition to basic preference information as described above, a seller may be provided the opportunity to set highly personalized sales criteria, for example criteria based upon: teams playing; team records; weather; day and time of the event; players, actors or other participants in an event; ancillary events such as television shows or movie releases or other 'competing' events that may occur during the same time period; conditional criteria such as a ticket price dependent on weather; a subjective likelihood, in the seller's opinion, that he will actually sell the tickets if an acceptable offer is received; and others as will now be apparent to the reader.

More complex preferences might include, for example, different cost thresholds for more complex, changeable conditions. For example the minimum offer price considered may be decreased on certain less desirable days or in bad weather conditions and increased on more desirable days and in good weather conditions. Minimum price criteria may be varied depending on other external events such as the success of the team during the season, the opponent for a series playoff, and countless other conditions pertinent to a ticket seller and which will now be apparent to the reader.

While preferences for a seller are set up at sign-up, for example using a survey process, the system can provide the seller with the capability to amend the preferences on an on-going basis. In one embodiment, the system may communicate with the sellers on a periodic basis, reminding them of their existing preferences and offering them the opportunity to confirm or change those preferences. In another embodiment, the seller may enter data relating to tickets not currently for sale, and the system may periodically provide reminders relating to all tickets entered, including tickets currently for sale and tickets not currently for sale. In this embodiment, sellers may periodically be offered the ability to not only change sales preferences, but to add and/or remove registered ticket inventory from the list of tickets for sale.

The system may further provide sellers with the ability to identify the likelihood of success of an offer based upon the seller's intentions. For example, listed tickets may be grouped into categories, for example: a "definitely going to attend" category where no offer will be considered, a "definitely not going to attend/want to sell" category where all offers meeting the minimum preference criteria will be considered, and an "undecided" category where the seller may or may not choose to consider offers. Potential buyers may thus decide whether to make an offer for tickets, and what the terms of an offer might be, accordingly.

System 102 thereby collects and processes ticket sales information to generate and publish a database of a potentially available supply of tickets (step 320). It will be understood that along with each ticket there is known substantial information based upon which the system may group and display tickets to potential buyers. Tickets may be displayed, for example, sorted by: events, dates, locations, minimum asking prices, likelihood of availability, the occurrence of external activities (e.g. a reduced price due to bad weather) and numerous other criteria pertinent to the buyer, seller and/or system operator and which will now be apparent to the reader.

Continuing with reference to FIG. 3, ticket buyers 106 are registered with system 102 (step 322) for the purpose of facilitating the processes of collecting and processing payments and delivering tickets. Information collected from a buyer may include, for example: financial payment information, address and ticket delivery information, and other information relevant to facilitating the sale of a ticket to the buyer. The buyer may then search available, published ticket inventory for tickets for a particular event that meets their needs (step 324). As noted above, different sort and presentation functions may be provided the buyer by the system in order to help the buyer search a large ticket inventor.

Upon finding a ticket(s) of interest, a buyer then assembles an offer for the ticket including entering a price they would be willing to pay (step 326). Optionally, the buyer may be provided historical data about acceptable bids for the selected ticket type and/or seller to assist the buyer in assembling an offer. In different embodiments of the invention, the buyer offer may be required to be binding and thus backed by a non-refundable (if accepted) credit card payment, or the offer may be non-binding and the buyer provided the opportunity to bind the offer only after acceptance by the seller. Optionally, buyers may be given an estimate of the amount of time within which they will be given an answer by the seller.

In one embodiment of the invention, buyer offers may be bound for different periods of time depending on the different circumstances. For example, a buyer offer may be bound for up to 12 hours when it is tendered in the range of 7-2 days before a game, for 3 hours when it is tendered 2 days to 1 day before a game and for one-half an hour when it is tendered the day of the game. During the bound period, the buyer will be obligated to actually purchase the ticket, for example using a credit card, if the seller accepts the offer. In another embodiment, buyers may be offered the opportunity to enter into non-binding auctions for a ticket for a premium charge, for example 10% above the actual winning price.

Figure 4:
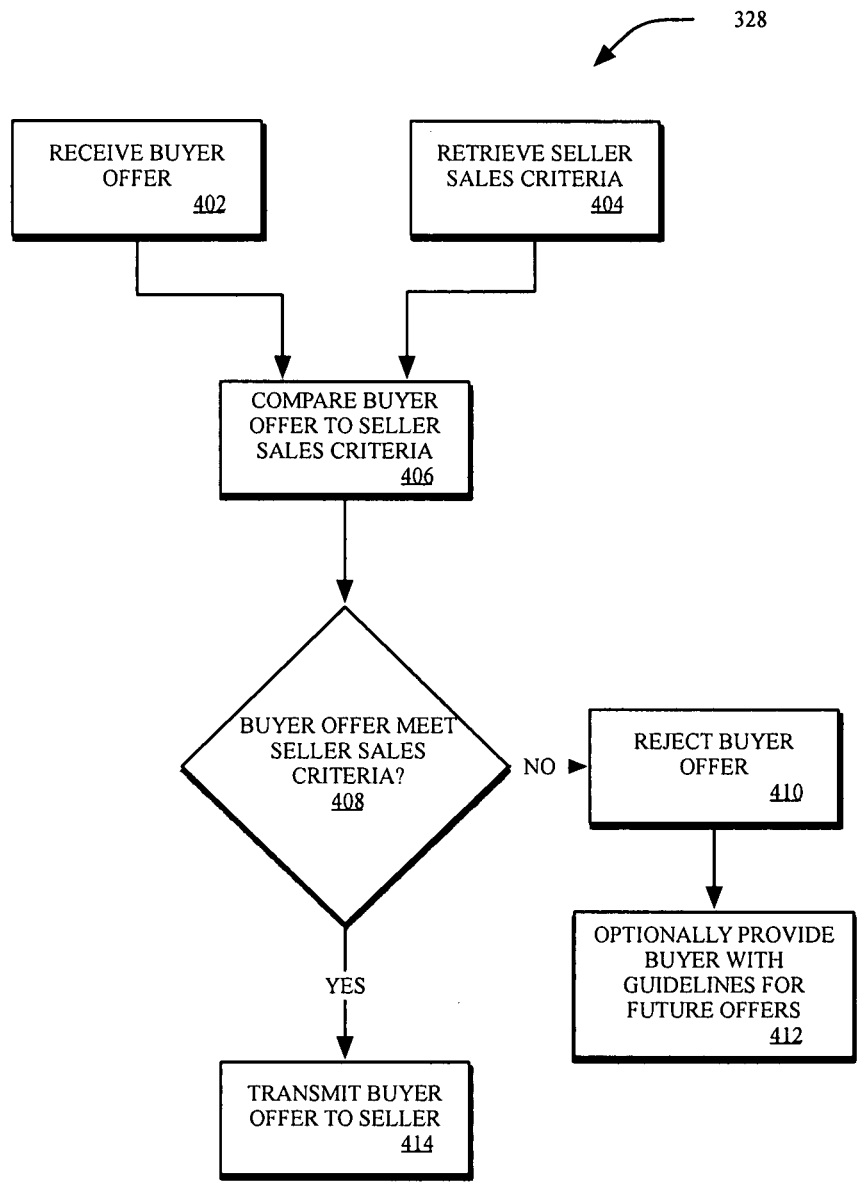
FIG. 4 is a flow chart showing the details of ticket offer process of FIG. 3.

Upon receipt of the buyer offer by the system, the system processes that offer in accordance with the criteria set by the seller (step 328). With reference to FIG. 4, the details of the system processing (step 328) are shown wherein the buyer offer is received (step 402) and the seller sales criteria are retrieved from system storage (step 404). The buyer offer and sales criteria are compared (step 406) to see if the offer meets the sales criteria (step 408). If the offer does not meet the sales criteria, the buyer offer is summarily rejected (step 410) without transmission to the seller for consideration. Optionally, the buyer may be provided with guidelines, information or other support to facilitate future offers (step 412). For example, if the offer tendered is below the minimum asking price, the buyer may be reminded of this and a suggestion made to increase the offer price of any future offer.

If the buyer offer meets the seller-set criteria (step 408), the buyer offer is communicated to the seller for consideration (FIG. 4, step 414: FIG. 3, step 330). This communication is preferably in accordance with the communication criteria established between the buyer and system when the buyer registered with the system. For example, sellers who hold tickets whose profiles indicate they may be willing to sell their tickets for the buyer offer may be communicated with via a short messaging system (SMS) instant message, a telephone call, by email or by any other appropriate communication channel. Optionally communicated to the seller is an amount of time during which they can reply with an affirmative or negative response. In different embodiments the offer may remain open for acceptance by the buyer for a limited period of time, until the beginning of or a period immediately prior to the beginning of the event, or the seller may establish criteria under which an acceptable offer is automatically accepted and the sale consummated by the system with no additional input by the seller.

Continuing with reference back to FIG. 3, depending on the initial response of the ticket seller (step 330), the system may facilitate negotiations, typically in the form of communicating counter-offers, back and fort between the buyer and the seller (steps 332, 334, 336). A seller may respond, for example that the ticket is available for a higher price than offered by the buyer. A buyer may respond offering to raise the price or otherwise enhance the offer, for example purchasing multiple tickets or insuring a purchase regardless of bad weather. In one embodiment, in order to facilitate a deal, the system might provide the buyer with historical information about the seller and what kinds of offers the seller has historically accepted, or whether a seller has tended to lower a ticket price as an event draws nearer.

When a ticket sale is consummated, the ticket and purchase price may be exchanged and the system may facilitate the deal in a variety of ways (steps 338, 340, 342). Regarding the ticket exchange, the ticket buyer may be provided the information necessary to either print their ticket offline or pick up their ticket at a will-call window at the event site. Physical tickets in the possession of the seller may be shipped from the seller, directly or through the system for verification purposes, to the buyer. In another embodiment, the system may actively print or otherwise obtain the ticket and deliver it to the buyer.

Similarly to the above-described ticket delivery, payment by the buyer may be consummated directly between the buyer and seller or facilitated through the system. In one embodiment, the system credits a seller account for the price of the ticket and debits a buyer account. Any system processing fee charged by the system for the services provided may be factored in to the amounts credited or debited, as determined between the system and the parties. In one embodiment, the system would charge a processing fee for a fixed amount per ticket or a percentage of the sales. Optionally, any difference between the seller asking price and the buyer offer price may be kept by the system as a transaction fee. In one embodiment, the system would provide the buyer and/or seller of a ticket with a reward in the form of a credit that can be used toward future ticket purchases or purchases toward team merchandise or gift cards.

Optionally, sellers that decline an offer that falls within the preset criteria for acceptance may be given the opportunity to alter the criteria and/or remove the tickets from the sales inventory of the system.

After a buyer and seller complete a transaction, the system provides for feedback from one or both parties (steps 342, 344, 346). For example, the buyer can provide feedback as to whether or not the seats and their location were as advertised and whether or not the ticket delivery was satisfactory. The seller can provide feedback as to whether the services provided were satisfactory. Over time, the system can develop a database as to the performance of the various parties. For example, data may be developed as to: i) which buyers prefer which tickets, ii) which sellers accept offers more often than other sellers, iii) which parties are honest in their communication of information and performance of the transaction, iv) what types of offers certain buyers are more likely to accept, and v) other information that improves the services of the system and satisfaction of the buyers and sellers. In this way, the system becomes more efficient at brokering ticket sales with improved satisfaction of both the buyers and sellers.

There have thus been provided new and improved methods and systems for facilitating subscription rights sales, typically in the form of season ticket sales, between buyers and sellers. In accordance with the present invention, ticket holders are provided with the ability to identify selected tickets and to flexibly and easily establish criteria under which they will entertain offers to sell these tickets. The invention thus provides ticket holders the opportunity to monetize unused tickets, under favorable conditions, based upon individual offers and without the requirement of a definite commitment to sell. Concomitantly, buyers are provided access to a large base of potentially available tickets, which might not otherwise be available for sale. Buyers may assemble offers based upon seller criteria and, in some instances, useful historical information. The invention facilitates the buyer/seller interaction by publishing available ticket information in useful formats, collecting and providing buyer offers which meet seller criteria to sellers for consideration, facilitating communications and negotiations between buyers and sellers, and facilitating the actual purchase and sale of tickets. The invention has application in the field of commerce and particularly in the field of ticket sales.

While the invention has been shown and described with respect to particular embodiments, it is not thus limited. Numerous modifications, changes and enhancements will now be apparent to the reader.

What is claimed is:

1. A method for selling a right to attend an event, comprising:
   a) receiving at a ticket processing system, ticket event information, from at least one season ticket holder for a group of subscription tickets to a series of events owned by the season ticket holder, wherein the ticket event information includes an event description, an event venue, an event date and time;
   b) receiving at the ticket processing system, ticket sales preference information, from the at least one season ticket holder, for the group of subscription tickets, wherein the ticket sales preference information defines terms and conditions under which the at least one season ticket holder will consider offers from prospective buyers to purchase tickets selected from the group of subscription tickets;
   c) displaying by the ticket processing system, the ticket event information and the ticket sales preference information for the group of subscription tickets for consideration by a plurality of buyers;
   d) receiving from a prospective buyer at the ticket processing system, an offer for a ticket of interest based at least in part on information provided by the ticket processing system to the prospective buyer including:
      (1) historical data collected by the ticket processing system including data pertaining to acceptable bids for the selected ticket type,
      (2) historical data collected by the ticket processing system pertaining to bids previously accepted by the ticket owner for the selected ticket type; and
      (3) historical data about the at least one season ticket holder and what kinds of offers the at least one season ticket holder has historically accepted;
   e) comparing at the ticket processing system, the offer received from the prospective buyer with the ticket event information and the ticket sales preference information, provided by the at least one season ticket holder, for the identified ticket of interest to determine if there is a match;
   f) communicating via the ticket processing system, the offer from the prospective buyer to the at least one season ticket holder in the case where there is a match;
   g) communicating via the ticket processing system, a response from the at least one season ticket holder to accept the buyer offer in the case where the at least one season ticket holder accepts the communicated buyer offer; and
   h) exchanging said identified ticket of interest between the at least one season ticket holder and the prospective buyer making said offer via said ticket processing system.

2. The method of claim 1 wherein the ticket sales preference information received from said at least one ticket holder at said ticket processing system includes determined ticket sales preference information comprising:
   (a) a fixed minimum offer price defining a threshold amount, below which the at least one season ticket holder will not entertain an offer from a prospective buyer, and
   (b) an offer window defining a starting date and an ending date within which time period a buyer offer will be considered by the at least one season ticket holder; and
   (c) a stipulated number of tickets to be purchased.

3. The method of claim 2 wherein the ticket sales preference information received from the at least one ticket holder at said ticket processing system further includes unpredictable ticket sales preference information comprising at least one of:
- (b) a change in the event participants, and
- (c) an announcement of at least one other event that is scheduled to take place during the same time period.

4. The method of claim 3 and further including the step of adjusting said determined ticket sales preference information as previously provided by said at least one ticket holder based upon the state of said at least one unpredictable ticket sales preference information as determined by said ticket processing system.

5. The method of claim 1 wherein the identified ticket of interest is one ticket from among the group of subscription tickets owned by the at least one season ticket holder.

6. The method of claim 1 and further including registering information about the owner with the ticket processing system including a method of communicating with the at least one season ticket holder.

7. The method of claim 1 and further including:
communicating to the at least one season ticket holder information regarding the status of one or more unsold tickets; and
receiving from the at least one season ticket holder communications regarding the one or more unsold tickets.

8. The method of claim 1 wherein the sales ticket preference information includes an indication from the at least one season ticket holder of the likelihood of acceptance of an offer.

9. The method of claim 1 further comprising registering information about the prospective buyer including a method of communicating with the prospective buyer.

10. The method of claim 1 wherein the ticket sales preference information include a requirement that the offer be a binding offer for a period of time.

11. The method of claim 1 wherein the step of communicating via the ticket processing system, the offer from the prospective buyer to the at least one season ticket holder in the case where there is a match includes at least one of
- (a) communicating terms of the offer for consideration by the at least one season ticket owner and
- (b) communicating an indication that the offer was automatically accepted in accordance with ticket sales preference information provided by the at least one season ticket owner.

12. The method of claim 1 and further including:
upon a completion of a transaction, receiving at the ticket processing system from the prospective buyer feedback on the performance of the at least one season ticket holder;
upon the completion of said transaction, receiving at the ticket processing system from the at least one season ticket holder feedback on the performance of the prospective buyer;
processing at the ticket processing system, the feedback on the performance on the at least one season ticket holder and the feedback on the performance of the prospective buyer; and
using the processed feedback for inclusion in a data store describing a plurality of interactions between the buyers and season ticket holders.

13. A method according to claim 1, wherein the ticket sales preference information comprises information personal to the at least one season ticket holder under which the at least one season ticket holder will consider offers from said prospective buyers to purchase tickets from the group of subscription tickets, the ticket sales preference information comprising at least one of:
- (a) teams from particular cities participating in the event,
- (b) team win and loss records participating in the event,
- (c) particular individuals from one of the teams participating in the event,
- (d) a different event occurring during the same time period.

14. A method according to claim 1, wherein the ticket sales preference information comprises conditional preference information for which the at least one season ticket holder will consider offers from said prospective buyers to purchase a ticket from the group of subscription tickets, the ticket sales preference information comprising at least one of:
- (a) a decrease of a minimum ticket price offer dependent on certain less desirable days on which an event occurs;
- (b) an increase of a minimum ticket price offer dependent on certain more desirable days on which an event occurs.

15. A system for selling a right to attend an event, comprising:
means for receiving at a ticket processing system, ticket event information, from at least one season ticket holder for a group of subscription tickets to a series of events owned by the season ticket holder, wherein the ticket event information includes an event description, an event venue, an event date and time;
means for receiving at the ticket processing system, ticket sales preference information, from the at least one season ticket holder, for the group of subscription tickets, wherein the ticket sales preference information defines terms and conditions under which the at least one season ticket holder will consider offers from prospective buyers to purchase tickets selected from the group of subscription tickets;
means for displaying by the ticket processing system, the ticket event information and the ticket sales preference information for the group of subscription tickets for consideration by a plurality of buyers;
means for receiving from a prospective buyer at the ticket processing system, an offer for a ticket of interest based at least in part on information provided by the ticket processing system to the prospective buyer including:
- (1) historical data collected by the ticket processing system including data pertaining to acceptable bids for the selected ticket type,
- (2) historical data collected by the ticket processing system pertaining to bids previously accepted by the ticket owner for the selected ticket type; and
- (3) historical data about the at least one season ticket holder and what kinds of offers the at least one season ticket holder has historically accepted;

means for comparing at the ticket processing system, the offer received from the prospective buyer with the ticket event information and the ticket sales preference information, provided by the at least one season ticket holder, for the identified ticket of interest to determine if there is a match;
means for communicating via the ticket processing system, the offer from the prospective buyer to the at least one season ticket holder in the case where there is a match;
means for communicating via the ticket processing system, a response from the at least one season ticket holder to accept the buyer offer in the case where the at least one season ticket holder accepts the communicated buyer offer; and means for exchanging said identified ticket of interest between the at least one season ticket holder and the prospective buyer making said offer via said ticket processing system.

16. A system for selling a right to attend an event including a processor and a memory device storing instructions for controlling the operation of the processor,
wherein said processor is configured for:
   a) receiving at a ticket processing system, ticket event information, from at least one season ticket holder for a group of subscription tickets to a series of events owned by the season ticket holder, wherein the ticket event information includes an event description, an event venue, an event date and time;
   b) receiving at the ticket processing system, ticket sales preference information, from the at least one season ticket holder, for the group of subscription tickets, wherein the ticket sales preference information defines terms and conditions under which the at least one season ticket holder will consider offers from prospective buyers to purchase tickets selected from the group of subscription tickets;
   c) displaying by the ticket processing system, the ticket event information and the ticket sales preference information for the group of subscription tickets for consideration by a plurality of buyers;
   d) receiving from a prospective buyer at the ticket processing system, an offer for a ticket of interest based at least in part on information provided by the ticket processing system to the prospective buyer including:
      (1) historical data collected by the ticket processing system including data pertaining to acceptable bids for the selected ticket type,
      (2) historical data collected by the ticket processing system pertaining to bids previously accepted by the ticket owner for the selected ticket type; and
      (3) historical data about the seller and what kinds of offers the seller has historically accepted;
   e) comparing at the ticket processing system, the offer received from the prospective buyer with the ticket event information and the ticket sales preference information, provided by the at least one season ticket holder, for the identified ticket of interest to determine if there is a match;
   f) communicating via the ticket processing system, the offer from the prospective buyer to the at least one season ticket holder in the case where there is a match;
   g) communicating via the ticket processing system, a response from the at least one season ticket holder to accept the buyer offer in the case where the at least one season ticket holder accepts the communicated buyer offer; and
   h) exchanging said identified ticket of interest between the at least one season ticket holder and the prospective buyer making said offer via said ticket processing system.

17. A non-transitory computer readable medium having computer readable instructions embedded therein which instructions when executed by the computer causing said computer to execute a method for facilitating the sale of a right to attend an event, comprising:
   a) receiving at a ticket processing system, ticket event information, from at least one season ticket holder for a group of subscription tickets to a series of events owned by the season ticket holder, wherein the ticket event information includes an event description, an event venue, an event date and time;
   b) receiving at the ticket processing system, ticket sales preference information, from the at least one season ticket holder, for the group of subscription tickets, wherein the ticket sales preference information defines terms and conditions under which the at least one season ticket holder will consider offers from prospective buyers to purchase tickets selected from the group of subscription tickets;
   c) displaying by the ticket processing system, the ticket event information and the ticket sales preference information for the group of subscription tickets for consideration by a plurality of buyers;
   d) receiving from a prospective buyer at the ticket processing system, an offer for a ticket of interest based at least in part on information provided by the ticket processing system to the prospective buyer including:
      (1) historical data collected by the ticket processing system including data pertaining to acceptable bids for the selected ticket type,
      (2) historical data collected by the ticket processing system pertaining to bids previously accepted by the ticket owner for the selected ticket type; and
      (3) historical data about the seller and what kinds of offers the seller has historically accepted;
   e) comparing at the ticket processing system, the offer received from the prospective buyer with the ticket event information and the ticket sales preference information, provided by the at least one season ticket holder, for the identified ticket of interest to determine if there is a match;
   f) communicating via the ticket processing system, the offer from the prospective buyer to the at least one season ticket holder in the case where there is a match;
   g) communicating via the ticket processing system, a response from the at least one season ticket holder to accept the buyer offer in the case where the at least one season ticket holder accepts the communicated buyer offer; and
   h) exchanging said identified ticket of interest between the at least one season ticket holder and the prospective buyer making said offer via said ticket processing system.

18. A method for selling a right to attend an event, comprising:
   a) receiving at a ticket processing system, ticket event information, from at least one season ticket holder for a group of subscription tickets to a series of events owned by the season ticket holder, wherein the ticket event information includes an event description, an event venue, an event date and time;
   b) receiving at the ticket processing system, ticket sales preference information, from the at least one season ticket holder, for the group of subscription tickets, wherein the ticket sales preference information defines terms and conditions under which the at least one season ticket holder will consider offers from prospective buyers to purchase tickets selected from the group of subscription tickets, wherein said terms and conditions comprise:
      a fixed minimum offer price defining a threshold amount, below which the at least one season ticket holder will not entertain an offer from a prospective buyer, and
      an offer window defining a starting date and an ending date within which time period a buyer offer will be considered by the at least one season ticket holder; and a stipulated number of tickets to be purchased;

c) displaying by the ticket processing system, the ticket event information and the ticket sales preference information for the group of subscription tickets for consideration by a plurality of buyers;

d) receiving from a prospective buyer at the ticket processing system, an offer for a ticket of interest based at least in part on information provided by the ticket processing system to the prospective buyer including:
   (1) historical data collected by the ticket processing system including data pertaining to acceptable bids for the selected ticket type,
   (2) historical data collected by the ticket processing system pertaining to bids previously accepted by the ticket owner for the selected ticket type; and
   (3) historical data about the at least one season ticket holder and what kinds of offers the at least one season ticket holder has historically accepted;

e) comparing at the ticket processing system, the offer received from the prospective buyer with the ticket event information and the ticket sales preference information, provided by the at least one season ticket holder, for the identified ticket of interest to determine if there is a match;

f) communicating via the ticket processing system, the offer from the prospective buyer to the at least one season ticket holder in the case where there is a match;

g) communicating via the ticket processing system, a response from the at least one season ticket holder to accept the buyer offer in the case where the at least one season ticket holder accepts the communicated buyer offer; and h) exchanging said identified ticket of interest between the at least one season ticket holder and the prospective buyer making said offer via said ticket processing system.

* * * * *